US012783786B2

(12) United States Patent
Gursha et al.

(10) Patent No.: US 12,783,786 B2
(45) Date of Patent: Nov. 3, 2026

(54) SYSTEMS AND METHODS FOR DYNAMIC HYPERLINKING

(71) Applicant: Rock Cube Holdings LLC, Syracuse, NY (US)

(72) Inventors: Michael Gursha, Chappaqua, NY (US); Douglas Gursha, Chappaqua, NY (US)

(73) Assignee: ROCK CUBE HOLDINGS LLC, Syracuse, NY (US)

( * ) Notice: Subject to any disclaimer, the term of this patent is extended or adjusted under 35 U.S.C. 154(b) by 0 days.

(21) Appl. No.: 17/822,669

(22) Filed: Aug. 26, 2022

(65) Prior Publication Data

US 2023/0061394 A1 Mar. 2, 2023

Related U.S. Application Data

(60) Provisional application No. 63/260,678, filed on Aug. 27, 2021.

(51) Int. Cl.

| | |
|---|---|
| ***G06F 40/134*** | (2020.01) |
| ***G06F 3/0481*** | (2022.01) |
| ***G06F 3/0484*** | (2022.01) |
| ***G06F 16/9535*** | (2019.01) |

(Continued)

(52) U.S. Cl.

CPC .......... *G06F 40/134* (2020.01); *G06F 3/0481* (2013.01); *G06F 3/0484* (2013.01); *G06F 16/9535* (2019.01); *G06F 16/9558* (2019.01); *G06F 40/103* (2020.01)

(58) Field of Classification Search

CPC ......... G06F 40/134; G06F 40/103–117; G06F 16/95–986; G06F 3/0481–0483; G06F 3/0484–0486; G06F 11/3438; H04L 67/535

See application file for complete search history.

(56) References Cited

U.S. PATENT DOCUMENTS

| | | | | |
|---|---|---|---|---|
| 7,457,798 B2 | 11/2008 | Capps | | |
| 7,890,850 B1 * | 2/2011 | Bryar | .................. | G06F 16/9577 715/204 |
| 9,805,135 B2 * | 10/2017 | Hamm | .................. | G06F 16/957 |

(Continued)

FOREIGN PATENT DOCUMENTS

| | | |
|---|---|---|
| CN | 108009206 A | 5/2018 |
| JP | 2008077227 A | 4/2008 |
| KR | 20130113275 A | 10/2013 |

OTHER PUBLICATIONS

Griffiths, Jon, et al. "Reconciling versioning and context in hypermedia structure servers." Metainformatics: International Symposium , MIS 2002, Esbjerg, Denmark, Aug. 7-10, 2002. Revised Papers. Springer Berlin Heidelberg, 2003. (Year: 2002).*

(Continued)

*Primary Examiner* — Liang Y Li

(74) *Attorney, Agent, or Firm* — McCoy Russell LLP

(57) ABSTRACT

A method is provided for generating a hyperlink in real-time. In one example, the method includes monitoring a user's interaction with a document and displaying a first hyperlink in the document at a user interface of a display device based on the user's interaction. An anchor and a destination of the first hyperlink may be mapped and to generate a dataset used to place a second hyperlink in the document during a subsequent hyperlink generation event.

23 Claims, 9 Drawing Sheets

(51) Int. Cl.
*G06F 16/955* (2019.01)
*G06F 40/103* (2020.01)

(56) References Cited

U.S. PATENT DOCUMENTS

| | | | | |
|---|---|---|---|---|
| 2002/0107882 | A1* | 8/2002 | Gorelick | G06F 40/134 715/205 |
| 2008/0114738 | A1* | 5/2008 | Chao | G06F 16/9558 707/E17.112 |
| 2013/0054371 | A1* | 2/2013 | Mason | G06Q 30/0256 705/14.64 |
| 2013/0246383 | A1* | 9/2013 | White | G06F 16/9535 707/723 |
| 2016/0253294 | A1* | 9/2016 | Allen | G06F 40/30 715/206 |
| 2016/0321252 | A1 | 11/2016 | Zhu et al. | |
| 2016/0371589 | A1* | 12/2016 | Golbandi | G06N 5/04 |
| 2018/0150562 | A1 | 5/2018 | Gundimeda et al. | |
| 2019/0243890 | A1* | 8/2019 | Kwatra | G06F 16/24575 |
| 2020/0134255 | A1* | 4/2020 | Nocedal | G06F 40/143 |
| 2020/0226195 | A1* | 7/2020 | Ziraknejad | G06F 3/0482 |
| 2021/0133270 | A1* | 5/2021 | Moyal | G06F 16/94 |
| 2021/0219117 | A1 | 7/2021 | Novo Diaz | |
| 2021/0271724 | A1* | 9/2021 | Pham | G06N 20/00 |

OTHER PUBLICATIONS

Longpradit, Panchit. Links Personalisation with Multi-Dimensional Linkbases. Diss. University of Southampton, 2007. (Year: 2007).*

ISA Korean Intellectual Property Office, International Search Report and Written Opinion Issued in Application No. PCT/US2022/075534, Dec. 16, 2022, WIPO, 11 pages.

Gauch, S. et al., "User Profiles for Pesonalized Information Access," The Adaptive Web, Lecture Notes in Computer Science, vol. 4321, Jan. 2007, 36 pages.

Şah, M. et al., "Dynamic Linking and Personalization on Web," Proceedings of the 2010 ACM Symposium on Applied Computing (SAC), Sierre, Switzerland, Mar. 22, 2010, 7 pages.

Vaddadi, P. et al., "Automatic augmentation of links in web browsing," International Journal of Information and Communication Technology, vol. 3, No. 1, Apr. 1, 2011, 7 pages.

Şah, M. et al., "Dynamic Linking and Personalization using Linked Open Data," International Journal on Semantic Web and Information Systems, vol. 2 No. 9, Apr. 2013, 31 pages.

European Patent Office, Extended European Search Report Issued in Application No. 22862299.9, Sep. 16, 2024, Germany, 11 pages.

* cited by examiner

SYSTEMS AND METHODS FOR DYNAMIC HYPERLINKING

CROSS REFERENCE TO RELATED APPLICATIONS

The present application claims priority to U.S. Provisional Application No. 63/260,678 entitled "SYSTEMS AND METHODS FOR DYNAMIC HYPERLINKING", and filed on Aug. 27, 2021. The entire contents of the above-identified applications are hereby incorporated by reference for all purposes.

FIELD

The disclosure relates generally to displaying hyperlinks on a webpage related to methods for continuously adjusting the hyperlink display based on user behavior.

BACKGROUND

Rising demand for readily accessible information has driven an increase in publicly available media, such as Internet-based content. Users may rely on websites hosted on the Internet where the websites may be used to consolidate information on a specific topic or range of topics and, in some examples, to find other websites of related content. The websites may include one or more webpages located under a common domain name, and navigation between the webpages of the website, as well as between the website and external websites, may be provided by hyperlinks.

A hyperlink is an HTML element, otherwise known as an anchor, that provides a link from a current electronic document, e.g., as displayed at the website, to other web pages, files, email addresses, locations within the same document, or anything other items a URL may address. The new document may be another webpage within the website or a webpage of an external website, e.g., a website belonging to a different domain name. The hyperlink may be located at a relevant point in the document, presented with content indicating the hyperlink's destination that indicates a topic of the linked document. Hyperlinks may also contain other forms of content besides text including HTML elements such as icons, images, and containers. For a website with few pages and a relatively small amount of content, the hyperlinks may be manually inserted (e.g., entered into a coding of the webpage) or may be automatically generated, e.g., using an algorithm for hyperlink generation, based on one or more keywords.

For a large-content website having numerous webpages covering large quantities of information, however, manual entry may be laborious, inefficient, and may lead to errors during entry. Keyword-based hyperlink generation may cause a webpage to appear cluttered and render the website less visually appealing. An excessive presence of hyperlinks on a webpage may lessen a likelihood that a user will interact with the hyperlinks, e.g., the user may become desensitized to an abundance of hyperlinks. In contrast, sparse placement of hyperlinks in a webpage with a large amount of information may reduce a visibility of the hyperlinks and the hyperlinks may be lost in the webpage text. As such, finding the hyperlinks on the webpage may become difficult.

Furthermore, the hyperlinks are anchored to hypertext in the webpage according to predetermined topics of interest and do not change whether the hyperlinks are used or not. In some instances, depending on a presentation of the hyperlink, the topic of interest and additional resources provided by the hyperlink may be not apparent based upon its appearance and the user may not realize a relevancy of the hyperlink to a topic of interest. For the large-content website in particular, it may be challenging to ensure that the user is able to navigate the website and locate useful information in an efficient manner via the fixed hyperlinks.

In addition, a static characteristic of the hyperlinks may render the hyperlinks obsolete over time. For example, in a webpage with deep links, e.g., links to specific content, a likelihood of the hyperlinks being correctly linked may decrease with time. In some instances, a number of hyperlinks that become broken or obsolete may increase over time. A usefulness of the webpage for providing information may thus be degraded as a result of the broken hyperlinks. Manually updating the webpage, however, may be inconvenient and ineffective as maintaining an accuracy of the hyperlinks may demand time-consuming monitoring and searching to locate migrated target destinations or to find new, suitable destinations for the hyperlinks.

It is desired to have systems and methods which enable dynamic and adaptive generation and presentation of hyperlinks to provide more meaningful and useful pathways to locating information.

SUMMARY

A hyperlink generating method is provided to monitor a user's interaction with a document and display a first hyperlink in the document based on the user's interaction. The method further includes mapping an anchor and a destination of the first hyperlink to generate a dataset used to place a second hyperlink in the document during a subsequent hyperlink generation event. In this way, a presentation of hyperlinks at the document is customized according to the user's interests, promoting engagement of the user with the document.

In one embodiment, a hyperlink generation engine may be utilized to monitor user behavior, with respect to interaction with the document, and collect user behavior data. The user behavior data may be used to select where hyperlinks are placed, how the hyperlinks are displayed, and what content is coupled to the hyperlinks. In some examples, the content of the hyperlinks may include a list of destinations which may be ranked according to relevancy. Furthermore, the hyperlink generation engine may be configured to generate a text-to-destination map of a website, thereby providing an efficient tool for determining placement of hyperlinks. The hyperlinks may be continually updated and modified according to dynamic user behavior.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The disclosure may be better understood from reading the following description of non-limiting embodiments, with reference to the attached drawings, wherein below.

DETAILED DESCRIPTION

Figure 1:
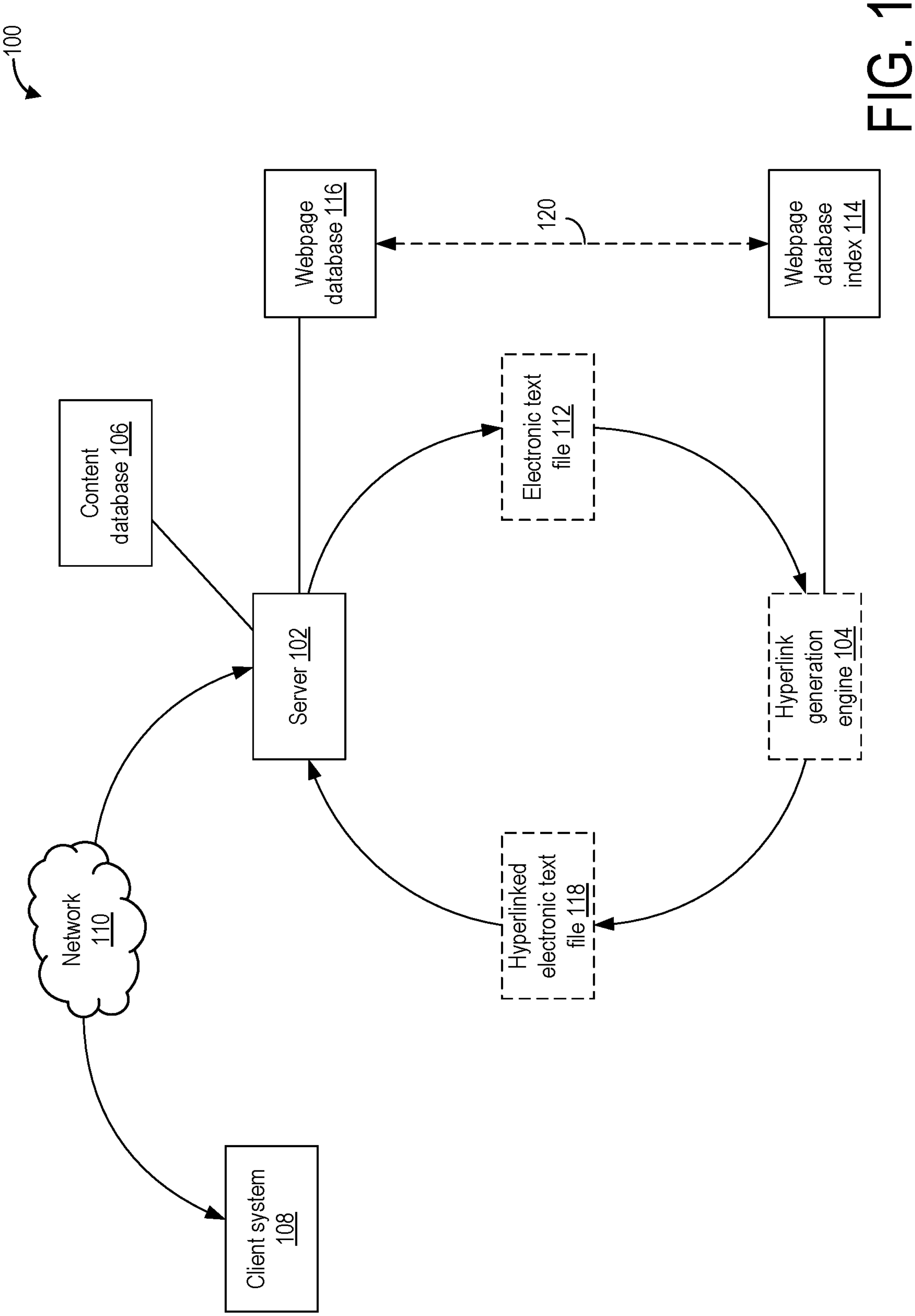
FIG. 1 shows a block diagram of an example dynamic hyperlink generation system configured to automatically insert hyperlinks into a document based on user behavior via a dynamic hyperlink generation engine.
Figure 2:
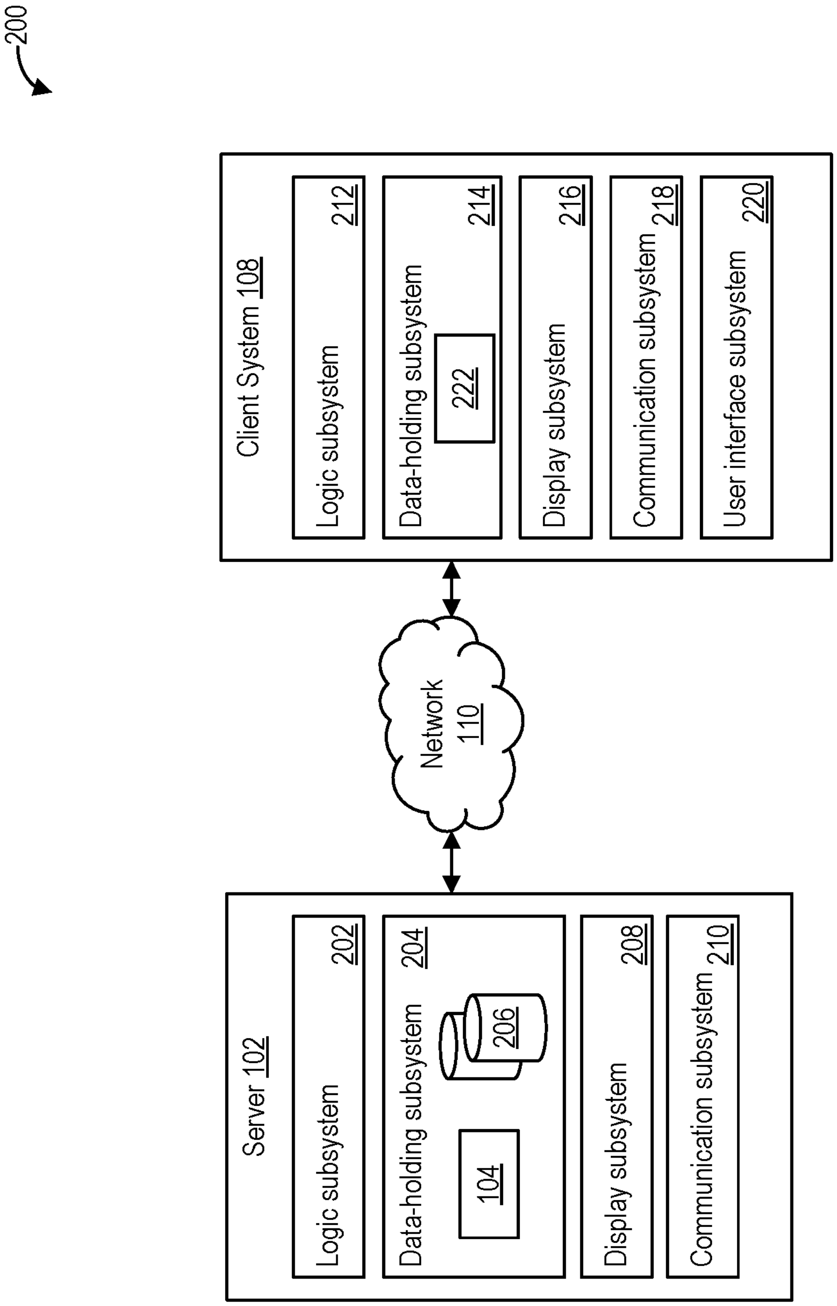
FIG. 2 shows a block diagram of an example networked computing system for automatically generating hyperlinks via the dynamic hyperlink generation engine.

The following description relates to various embodiments of a dynamic hyperlink generation system. The dynamic hyperlink generation system may be configured with a hyperlink generation engine, as shown in FIG. 1, which may insert hyperlinks into a document, e.g., a webpage, in real-time. The dynamic hyperlink generation system may be included in a networked computing system, as shown in FIG. 2, and may adjust a placement and appearance of the hyperlinks based on a user's interaction with the webpage. Methods for generating, inserting, and presenting the hyperlinks are provided in FIGS. 3-5, 7, and 9. Examples of modifications to an appearance of a hyperlink is shown in FIGS. 6A-6B and examples of a hyperlink coupled to a list of destinations is depicted in FIGS. 8A-8B.

It should be appreciated that although text hyperlinks are described herein, the systems and methods may be implemented for non-text anchored hyperlinks, such as hyperlinks configured as images, icons, HTML elements, etc. Anchors of the hyperlinks may be linked to different types of destinations, including webpages, both internal and external to a hyperlinked website, electronic documents, images, etc. The destinations may include a variety of mixed file types including document file types, image file types, video file types, music file types, PDFs, PNGs, JPGs, TXTs, spreadsheet file types, and the like.

Turning now to FIG. 1, a dynamic hyperlink generation system 100 is depicted as a block diagram therein. The dynamic hyperlink generation system (hereafter, system) 100 may automatically generate and insert hyperlinks into electronic text files in real-time according to user behavior, as described further below. The hyperlinks may associate digital content of various types to the electronic text files.

The system 100 may include a server, e.g., a web server, 102, a hyperlink generation engine 104, and a content database 106. The hyperlink generation engine 104 may draw linked content from the content database 106 and may include instructions and algorithms for performing tasks as described herein. The server 102 may be connected to a client system 108 by a network 110 (e.g., the Internet). It will be appreciated that while only one of each of the server 102, client system 108, network 110, etc., are shown, other examples may include more than one of each element of the system 100. Furthermore, alternate types of each element are possible. For example, the server 102 may be configured to host Internet activity or may be a server within a networked environment.

The server 102 may host data content, such as webpages with electronic text files. The electronic text files may be various types of text-based, computer readable files, including electronic documents, emails, new and other content-related articles, blog postings, etc. Each of the electronic text files may be formed of a Hyper-Text Markup Language (HTML) file, an Extensible Hyper-Text Markup Language (XHTML) file, or some other similar type of file. In one example, the electronic text files may be HTML files that are hosted and displayed on a website at the client system 108 by way of the server 102 and the network 110.

The electronic text files may be stored in the content database 106 to be retrievable upon demand when hyperlink creation is initiated. As an example, the server may retrieve an electronic text file 112 from the content database 106 and deliver the file 112 to the hyperlink generation engine 104. The hyperlink generation engine 104 may analyze and process the file 112 as described below, with reference to FIGS. 3-9, to insert hyperlinks at target locations within the file 112. Each of the hyperlinks may be a bridge between a point in the electronic text file in which the hyperlinks are embedded, e.g., an anchor of a hyperlink, and a source of related information in a different location from the anchor, e.g., a destination of the hyperlink.

Hyperlinks use an href attribute to specify a URL that the hyperlink links to. Other protocols besides HTTP-based URLs may be used that adhere to URL schemes supported by web browsers. Other hyperlink attributes include a target, e.g., where to display the linked URL in a webpage, and a Download attribute which prompts a user to save the linked URL to a computer instead of navigating to the URL. When adding hyperlinks to the electronic text file 112 from the content database 106, the hyperlink generation engine 104 may modify the electronic text file 112 by adding hyperlinks where determined. A resulting, modified version of the electronic text tile may be stored separately from the original file. The electronic text file 112 may be written and parsed in a variety of formats including plain text, Markdown, etc., and may eventually be converted into HTML by the server 102 before returning to the user.

The destination may be in a different section of the same electronic text file as the anchor, in a different electronic text file included in a same website formed of one or more electronic text files, or in a different website. The anchor of the hyperlink may be a visually distinct character, word, phrase, sentence, image, emoji, symbol, etc., in a webpage displayed to the user that allows the user to readily access additional information germane to a topic indicated by the anchor. Herein, the hyperlink may provide a link between a mutable anchor and a destination that is selected based on the anchor. For example, the anchor may be altered in real-time to accommodate an indicated topic of interest of the user which may be determined by monitoring the user's behavior as the user interacts with the webpage. The destination of the hyperlink may be similarly adjusted in real-time according to changes in the anchor, thereby increasing a likelihood that the user is able to rapidly obtain useful information.

The target locations of the electronic text file 112 may be used to query a webpage database index 114 to identify and locate websites that are relevant to the target locations. The webpage database index 114 may include indexed internal webpages, e.g., webpages included in a same website at which the electronic text file 112 is displayed, and/or external webpages, e.g., webpages included in a different website from the website at which the electronic text file 112 is displayed, or indexed versions of other types of electronic documents. The indexed webpages of the webpage database index 114 may be webpages identified with metadata related to the target locations of the electronic text file 112 and the hyperlink generation engine 104 may query the webpage database index 114 to locate webpages with metadata identifiers that correspond to the target locations.

Upon identifying the related webpages, the hyperlink generation engine 104 may dynamically generate a hyperlink at each of the target locations of the electronic text file 112, thereby linking the electronic text file 112 to an associated webpage at each hyperlink. In one example, the webpage database index 114 includes indexed versions of webpages that mirror the webpages stored in webpage database 116, the webpage database may be stored at the server 102. As webpages are added or removed from the webpage database 116, the webpage database index 114 may be updated accordingly via communication link 120. The hyperlink generation engine 104 is able to access addresses and locations of the webpages stored in webpage database 116 through communication link 120. The electronic text file 112 is transformed into a hyperlinked electronic text file 118 by the hyperlink generation engine 104 and made accessible to the client system 108 by returning the hyperlinked electronic text file 118 to the server 102. In some examples, the hyperlinked electronic text file 118 may be stored at the content database 106.

Details of the server 102 and the client system 108 are depicted in FIG. 2. FIG. 2 is a block diagram illustrating an example networked computing system 200, according to an embodiment. The networked computing system 200 includes the server 102 and the client system 108, communicatively coupled to the server 102 via the network 110. It should be appreciated that variations in the arrangement and type of components of the networked computing system 200 may be made without departing from the scope of the present disclosure. For example, the networked computing system 200 may include more than one client system 108 communicatively coupled to the server 102 via the network 110.

The server 102 includes a computing system configured to serve webpages upon request to one or more client systems such as the client system 108. Although the server 102 is depicted in FIG. 1 as a single device, in some embodiments the networked computing system 200 may include a plurality of servers 102 configured for distributed computing. In different embodiments, the server 102 may take the form of a mainframe computer, a server computer, a desktop computer, a laptop computer, a tablet computer, a network computing device, a mobile computing device, a microprocessor, and so on.

Server 102 includes a logic subsystem 202 and a data-holding subsystem 204. Logic subsystem 202 may include one or more physical devices configured to execute one or more instructions. For example, logic subsystem 202 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

Logic subsystem 202 may include one or more processors that are configured to execute software instructions. Additionally or alternatively, the logic subsystem 202 may include one or more hardware or firmware logic machines configured to execute hardware or firmware instructions. Processors of the logic subsystem 202 may be single core or multi-core, and the programs executed thereon may be configured for parallel or distributed processing. The logic subsystem 202 may optionally include individual components that are distributed throughout two or more devices, which may be remotely located and/or configured for coordinated processing. One or more aspects of the logic subsystem 202 may be virtualized and executed by remotely accessible networked computing devices configured in a cloud computing configuration.

Data-holding subsystem 204 may include one or more physical devices configured to hold data and/or instructions executable by the logic subsystem 202 to implement the herein described methods and processes. When such methods and processes are implemented, the state of data-holding subsystem 204 may be transformed (for example, to hold different data).

As described above, the server 102 may be a web server for automatically generating hyperlinks in a document such as a webpage. In particular, as described further herein, the hyperlink generation engine 104 may evaluate code relating to electronic files metadata uploaded to the data-holding subsystem 204, generate one or more databases 206, including the webpage database index 114 and the webpage database 116 of FIG. 1, based on the evaluated code, and automatically generate a hyperlink without further user input. Although the one or more databases 206 are depicted as stored in the data-holding subsystem 204 of the server 102, it should be appreciated that in some examples, the one or more databases 206 may be stored in a separate computing system communicatively coupled to the server 102 and accessible via the network 110.

The server 102 may further include a display subsystem 208 and a communication subsystem 210. When included, display subsystem 208 may be used to present a visual representation of data held by data-holding subsystem 204. As the herein described methods and processes change the data held by the data-holding subsystem 204, and thus transform the state of the data-holding subsystem 204, the state of display subsystem 208 may likewise be transformed to visually represent changes in the underlying data. Display subsystem 208 may include one or more display devices utilizing virtually any type of technology. Such display devices may be combined with logic subsystem 202 and/or data-holding subsystem 204 in a shared enclosure, or such display devices may be peripheral display devices.

When included, communication subsystem 210 may be configured to communicatively couple the server 102 with one or more other computing devices, such as client system 108. Communication subsystem 210 may include wired and/or wireless communication devices compatible with one or more different communication protocols. As non-limiting examples, communication subsystem 210 may be configured for communication via a wireless telephone network, a wireless local area network, a wired local area network, a wireless wide area network, a wired wide area network, etc. In some embodiments, communication subsystem 210 may allow the server 102 to send and/or receive messages to and/or from other devices via the public Internet. For example, communication subsystem 210 may communicatively couple the server 102 with client system 108 via the network 110. In some examples, the network 110 may be the public Internet. In other examples, the network 110 may be regarded as a private network connection and may include, for example, a virtual private network or an encryption or other security mechanism employed over the public Internet.

Further, the server 102 provides a network service that is accessible to a plurality of users through a plurality of client systems such as the client system 108 communicatively coupled to the server 102 via the network 110. As such, the networked computing system 200 may include one or more devices operated by users, such as client system 108. Client system 108 may be any computing device configured to access a network such as network 110, including but not limited to a personal desktop computer, a laptop, a smartphone, a tablet, and the like. While one client system 108 is shown, it should be appreciated that any number of user devices or client systems may be communicatively coupled to the server 102 via the network 110.

Client system 108 includes a logic subsystem 212 and a data-holding subsystem 214. Client system 108 may optionally include a display subsystem 216, communication subsystem 218, a user interface subsystem 220, and/or other components not shown in FIG. 2.

Logic subsystem 212 may include one or more physical devices configured to execute one or more instructions. For example, logic subsystem 212 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

Logic subsystem 212 may include one or more processors that are configured to execute software instructions. Additionally or alternatively, the logic subsystem 212 may include one or more hardware or firmware logic machines configured to execute hardware or firmware instructions. Processors of the logic subsystem 212 may be single or multi-core, and the programs executed thereon may be configured for parallel or distributed processing. The logic subsystem 212 may optionally include individual components that are distributed throughout two or more devices, which may be remotely located and/or configured for coordinated processing. One or more aspects of the logic subsystem 212 may be virtualized and executed by remotely accessible networking computing devices configured in a cloud computing configuration.

Data-holding subsystem 214 may include one or more physical, non-transitory devices configured to hold data and/or instructions executable by the logic subsystem 212 to implement the herein described methods and processes. When such methods and processes are implemented, the state of data-holding subsystem 214 may be transformed (for example, to hold different data).

Data-holding subsystem 214 may include removable media and/or built-in devices. Data-holding subsystem 214 may include optical memory (for example, CD, DVD, HD-DVD, Blu-Ray Disc, etc.), and/or magnetic memory devices (for example, hard drive disk, floppy disk drive, tape drive, MRAM, etc.), and the like. Data-holding subsystem 214 may include devices with one or more of the following characteristics: volatile, nonvolatile, dynamic, static, read/write, read-only, random access, sequential access, location addressable, file addressable, and content addressable. In some embodiments, logic subsystem 212 and data-holding subsystem 214 may be integrated into one or more common devices, such as an application-specific integrated circuit or a system on a chip.

When included, display subsystem 216 may be used to present a visual representation of data held by data-holding subsystem 214. As the herein described methods and processes change the data held by the data-holding subsystem 214 and thus transform the state of the data-holding subsystem 214, the state of display subsystem 216 may likewise be transformed to visually represent changes in the underlying data. Display subsystem 216 may include one or more display devices utilizing virtually any type of technology. Such display devices may be combined with logic subsystem 212 and/or data-holding subsystem 214 in a shared enclosure, or such display devices may be peripheral display devices.

In one example, the client system 108 may include executable instructions 222 in the data-holding subsystem 214 that when executed by the logic subsystem 212 cause the logic subsystem 212 to perform various actions as described further herein. As one example, the client system 108 may be configured, via the instructions 222, to receive a webpage including one or more hyperlinks transmitted by the server 102, and display the hyperlinked webpage via a graphical user interface on the display subsystem 216 to a user.

When included, communication subsystem 218 may be configured to communicatively couple client system 108 with one or more other computing devices, such as the server 102. Communication subsystem 218 may include wired and/or wireless communication devices compatible with one or more different communication protocols. As non-limiting examples, communication subsystem 218 may be configured for communication via a wireless telephone network, a wireless local area network, a wired local area network, a wireless wide area network, a wired wide area network, etc. In some embodiments, communication subsystem 218 may allow the client system 108 to send and/or receive messages to and/or from other devices, such as the server 102, via the network 110.

The client system 108 may further include the user interface subsystem 220 including user input devices such as keyboards, mice, game controllers, cameras, microphones, and/or touch screens. A user of client system 108 may input a request to load or otherwise interact with the hyperlink of the webpage stored by the server 102, for example, via user interface subsystem 220.

Thus the server 102 and the client system 108 each represent computing devices which may generally include any device that is configured to perform computation and that is capable of sending and receiving data communications by way of one or more wired and/or wireless communication interfaces. Such devices may be configured to communicate using any of a variety of network protocols. For example, the client system 108 may be configured to execute a browser application stored as the instructions 222 that employs HTTP to request information from the server 102 and then displays the retrieved information to a user on a display such as the display subsystem 216.

The hyperlink generation engine, e.g., the hyperlink generation engine 104 of FIGS. 1 and 2, may allow hyperlinks of a webpage to be continually updated based on user behavior as the user interacts with the webpage. In other words, the hyperlink generation engine 104 may allow prediction and adaptation of displayed hyperlinks to be adjusted in a manner specific to the user. By enabling dynamic generation of hyperlinks, a user experience may be enhanced when navigating the webpage and the user may obtain desired information more efficiently. Furthermore, the hyperlinks may be positioned in more aesthetically appealing and meaningful locations in the webpage, thereby increasing a likelihood that the user interacts with the hyperlinks.

As an example, in a conventional system for generating hyperlinks, a keyword in the electronic text file may be identified to be hyperlinked, resulting in creation of a hyperlink with each iteration of the keyword in the webpage. The hyperlinks may therefore be anchored to the keyword in the text and may be fixed and immutable during navigation of the webpage. The hyperlinked keyword may become redundant, and in some examples, may appear numerous times within a single section of text, e.g., within a paragraph of text. In instances where multiple hyperlinked keywords are displayed in the section of text, with each of the keywords appearing more than once within the section, an abundance of hyperlinks in the section may cause the text to appear cluttered which may be off-putting to the user.

In one example, as described herein, a hyperlink generation engine may utilize machine learning to adjust both a placement and a presentation of the hyperlinks in real-time. As one example, if the user does not interact with a hyperlinked element after a first appearance of the hyperlinked element, and the user proceeds to navigate to topics unrelated to the hyperlinked element, further hyperlinking of the same element may be terminated. Alternatively, if the user does not interact with the hyperlinked element but navigates to topics related to the hyperlinked element, an appearance of the hyperlinked element may be adjusted to attract an attention of the user. Other examples of how the hyperlink generation engine may dynamically enhance a presentation of hyperlinks in a webpage according to user behavior are provided in the following description, with reference to FIGS. 3-9.

Figure 3:
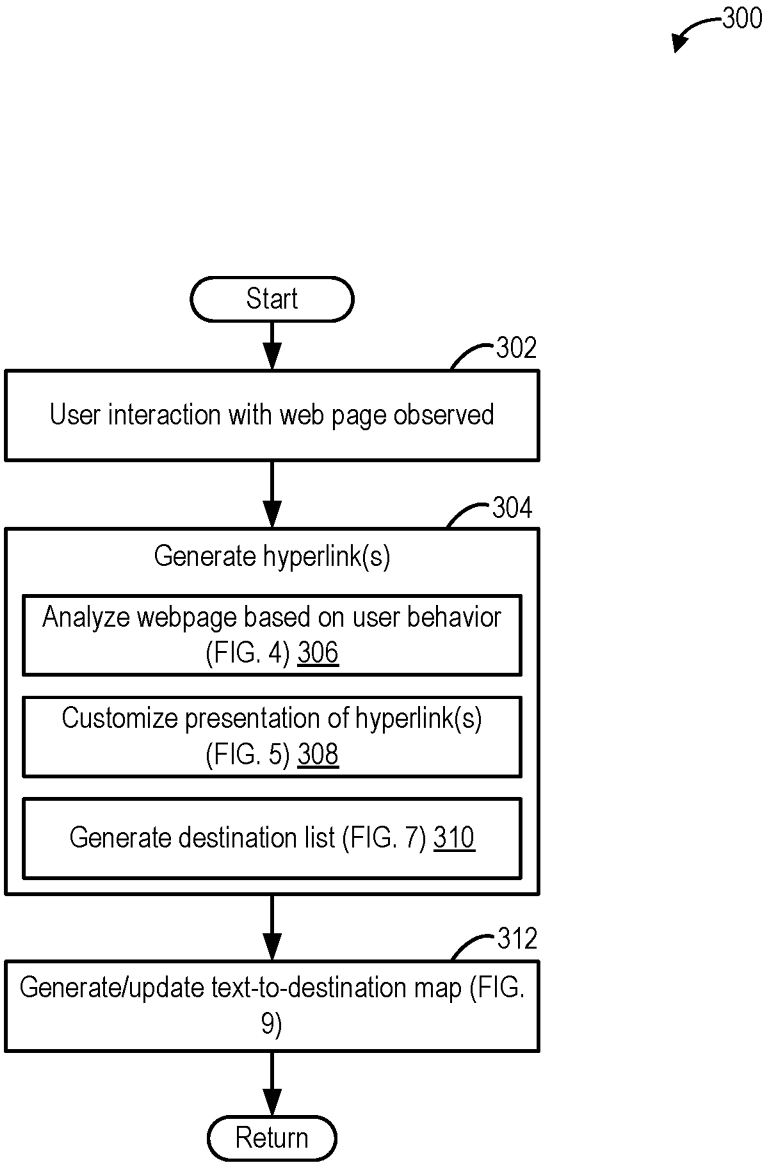
FIG. 3 shows an example of a high-level method for generating and inserting hyperlinks into a document based on user behavior.

An example of a high-level method 300 for dynamic hyperlink generation in real-time is depicted in FIG. 3. The method 300, and the rest of the methods herein, may be executed by a hyperlink generation engine, such as the hyperlink generation engine 104 of FIGS. 1 and 2, based on instructions stored on a memory of a logic subsystem, such as the logic subsystem 202 of FIG. 2. The instructions, when executed, enable processors of the logic subsystem to analyze webpages and read meta data thereof. As described above, with reference to FIG. 1, an electronic text file may be received by the hyperlink generation engine from a server and dynamic hyperlink generation may be performed on a looping and continual basis as user behavior changes. In other words, hyperlinks of a webpage may be continuously updated and modified as the user interacts with the webpage.

At 302, method 300 includes observing interaction of the user with the webpage of a website. For example, the user may navigate to the webpage on a client system, such as the client system 108 of FIGS. 1 and 2, by entering a web address of the website in a web browser. The user may scroll through the webpage, indicating that the user is browsing the webpage to obtain information. The interaction of the user with the webpage may be tracked via algorithms implemented at a processor of the client system to monitor user navigation through the webpage. For example, the algorithms may include instructions to log and store, in real-time, information such as positioning of a cursor relative to the webpage, engagement of hyperlinks present in the webpage, a frequency of refreshing of a visible screen of the webpage resulting from scrolling of the user, etc. The information may be stored in transient memory of the client system and may be accessible by processors of a server, such as the server 102 of FIGS. 1 and 2, via a communication link between the client system and the server.

At 304, the method includes automatically generating one or more hyperlinks as the user is interacting with the webpage. Generating the one or more hyperlinks may include analyzing the webpage based on user behavior at 306, as described below with reference to FIG. 4, customizing a presentation of the one or more hyperlinks to the user at 308, as described below with reference to FIG. 5, as well as generating a destination list at 310, as described below with reference to FIG. 7. For example, the webpage may already include hyperlinks and a placement of the hyperlinks may be modified based on user behavior which may be determined by monitoring how the user interacts with the webpage. The presentation of the hyperlinks, e.g., either hyperlinks already present or the modified hyperlinks, may be customized based on the monitored user behavior, and applying machine learning algorithms, to alter a visual representation of the hyperlinks. Additionally, by generating the destination list, the hyperlinks may be further adapted to be associated with more than one destination, e.g., each of the hyperlinks may be linked to multiple hyperlinks, to provide more options for related content to the user.

The method further includes generating a text-to-destination map at 312. The generation of the text-to-destination map is described at FIG. 9 and may be used as a tool for building a record of which elements, e.g., target locations, of the webpage are hyperlinked and what the hyperlinks connect the webpage to. In other words, the text-to-destination map provides a dataset comprising linkable text, such as nouns, entities, names, phrases, etc., mapped to destination webpages or websites. Furthermore, the text-to-destination map may store relationships and associations between one or more linkable texts and one or more destinations where the hyperlinks are generated based on the stored relationships and associations. The stored relationships and associations may be used to determine locations and appearances for display of future hyperlinks (e.g., hyperlinks not yet created or not yet modified according to user behavior).

In some examples, the text-to-destination map may be created upon initial implementation of the hyperlink generation engine at a website. In other examples, the text-to-destination map may already exist for the website and may be modified based on the changes to the hyperlinks, such as changes to any linkable texts or destinations, executed by the hyperlink generation engine. Method 300 returns to the start.

Figure 4:
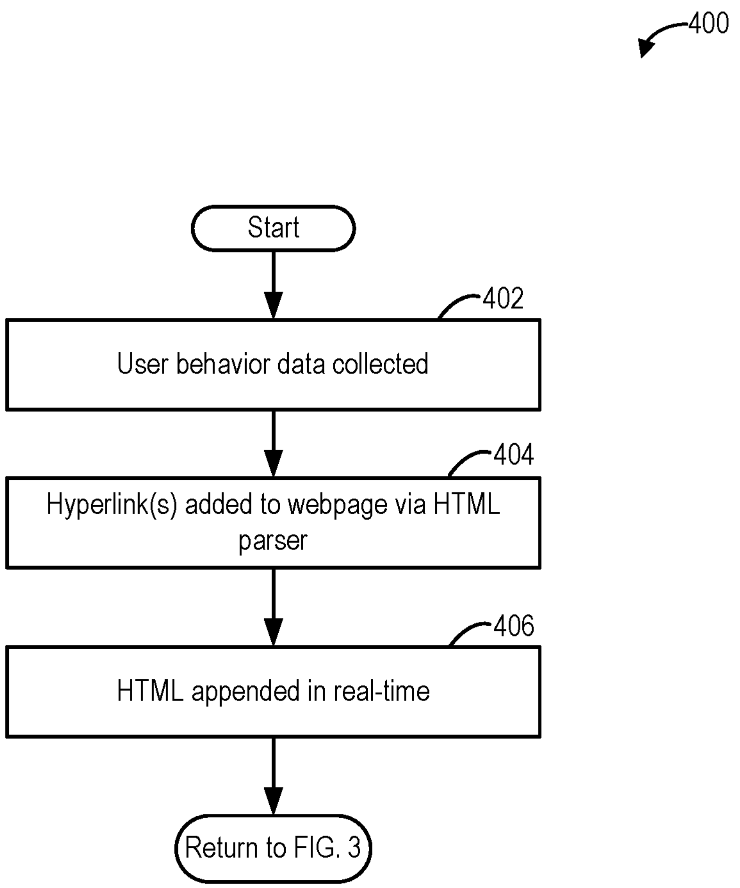
FIG. 4 shows an example of a method for determining a placement of hyperlinks based on user behavior which may be included in the method of FIG. 3.

Turning now to FIG. 4, a method 400 for the hyperlink generation engine for analyzing hyperlink positioning and presentation on a webpage is depicted. At 402, the method includes collecting user behavior data. For example, the hyperlink generation engine may track movement of a user input device, such as a mouse, as well as where the user clicks the mouse, e.g., depresses a button of the mouse based on a position of the mouse cursor at a user interface. In some examples, a region of the webpage that the mouse hovers over for a longer duration than other regions, selection of already existing hyperlinks, sections of the webpage where scrolling is rapid versus sections where scrolling is slow, etc., may be monitored and processed by the hyperlink generation engine, according to the machine learning algorithms.

In some examples, the user behavior data may be used to teach the hyperlink generation engine, e.g., via machine learning, how to predict which elements of the webpage (such as words, phrases, images, etc.) may be a target source of information for the user. The machine learning algorithms may allow the hyperlink generation engine to adaptively adjust an output of the hyperlink generation engine according to a number of samples obtained for learning. Thus, as the user continues to navigate the webpage, the hyperlink generation engine may be able to provide increasingly accurate predictions of target information where the predictions are tailored to the specific user.

For example, the hyperlink generation engine may identify sections of text where the user pauses scrolling or allows the mouse to hover over for a duration of time. For example, the duration of time may be 5 seconds, 8 seconds, etc. Common elements between the sections may be identified and used to generate hyperlinks in subsequent sections of the webpage, such as sections the user has not yet navigated to or sections the user is anticipated to navigate to, based on a direction of scrolling. Furthermore, elements in sections through which the user quickly scrolls that are not found in the sections where the user pauses scrolling may be rejected as possible hyperlink anchors.

The hovering of the mouse cursor over a particular word or section of the webpage may also trigger generation of a hyperlink or multiple hyperlinks at the word or the section, respectively. More specifically, when the mouse cursor is paused at the word for the duration of time described above, a single hyperlink may be automatically created at the word. Similarly, when the mouse cursor is paused within a vicinity of the section of the webpage for the duration of time, keywords may be identified within the section and automatically hyperlinked.

In other examples, various other actions may trigger generation of one or more hyperlinks at the webpage in addition to hovering of the mouse cursor. For example, clicking on the word or the section, swiping (e.g., using a fingertip at a touch screen), tapping at a touch screen, and other types of motions may indicate a desire for additional information from the word or the section. Identification of the demand for more information via the hyperlink generation engine may enable automatic generation of hyperlinks within the user's orbit of view.

As another example, selection (or lack of selection) of already existing hyperlinks in the electronic text file of the webpage may be used to learn the user's behavior. For example, if the user does not select the already existing hyperlinks in a section at which the user pauses scrolling, similarly anchored hyperlinks in the webpage may be removed. However, in some examples, the user's behavior may indicate that the already existing hyperlink may provide salient information to the user but the user may not notice the hyperlink or may not realize the relevance of the hyperlink. In such instances, a presentation of the hyperlink may be modified, as described below with reference to FIG. 5.

In other examples, user behavior data may also be collected according to scrolling, clicking, navigation patterns, engagement and sharing, and other user actions. Heat maps, session recordings, feedback widgets, and surveys may be used to obtain detailed user behavior data. Session data may be collected including date and time, session duration, etc. Contents of the hyperlink may be recorded including meta data associated with the user, such as a styling of the hyperlink, element type, and other types of meta data. The other types of meta data may include, for example, whether the link opens the destination in a new browser tab or window. A source of the hyperlink may be recorded to determine a user location during user interaction with the hyperlink (e.g., when the user clicks the hyperlink using a mouse cursor or another method of user engagement with the hyperlink).

The user behavior, as described above, and hyperlink data may be recorded in an analytics engine configured to allow the hyperlink generation engine to output more attractive placement of the hyperlinks based on previous user habits and engagement with the webpage. As such, the user may be more likely to interact with the hyperlinks. In addition, determination of which destinations to couple to the hyperlinks may be adjusted based on monitoring user behavior. As an example, bulk user data collected according to clicking, or other types of engagement with the hyperlinks, may aid in selecting optimal locations to place the hyperlinks. Furthermore, A/B testing (e.g., split testing or bucket testing) may be conducted to evaluate different placements of one hyperlink and assess effects of varying the hyperlink content in combination with the collection of user data. Results of the testing may be used to determine future placement of hyperlinks.

Method 400 further includes using an HTML parser of the hyperlink generation engine to add one or more hyperlinks to the electronic text file of the webpage at 404. The HTML parser may be a software package used to access, analyze, and modify text (e.g., html, markdown, etc.) and may be implemented at a server, such as the server 102 of FIGS. 1 and 2. A new, hyperlinked version of the electronic text file may be created by the HTML parser that is delivered, e.g., presented, to the user. Additional real-time appending of the hyperlinks may be conducted using javascript and a Document Object Model (DOM) parser.

As described above, the electronic text file may include other types of text besides HTML, including plain text, Markdown, etc., and as such, other types of parsers corresponding to the type of text may be used. The hyperlinks may be added automatically (e.g., without manual input) by altering the HTML code of the electronic text file to incorporate the hyperlink and adjusting a visual appearance of the hyperlink anchor at the webpage. The hyperlinks may be associated with a destination based on a webpage database index and a webpage database, such as the webpage database index 114 and the webpage database 116 of FIG. 1.

At 406, the method includes appending the HTML code of the electronic text file in real-time. As such, as the user interacts with the webpage, hyperlinks may be added and/or removed according to the learned behavior of the user. For example, as the user scrolls up or down the webpage, the HTML code of a new section of text that is about to become visible to the user may be appended prior to display. The hyperlink generation engine therefore continuously monitors and updates the HTML code of the electronic text file using javascript for as long as the user is interacting with the webpage. Method 400 returns to method 300 of FIG. 3, e.g., to 304 of method 300.

Figure 9:
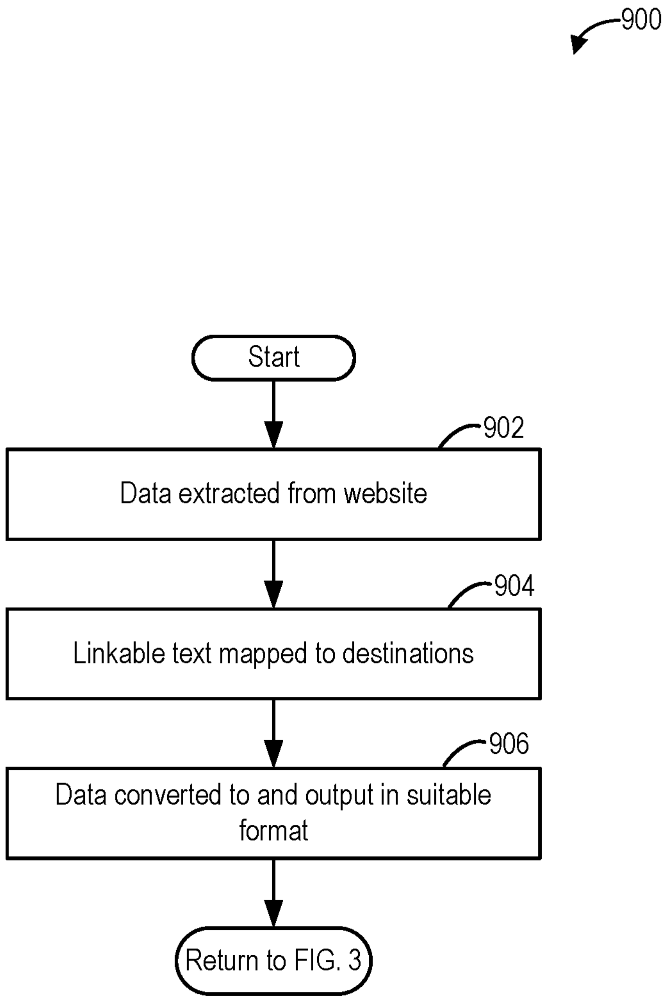
FIG. 9 shows an example of a method to generate a hyperlink map of a website which may be included in the method of FIG. 3.

In some examples, method 400 may be assisted by the text-to-destination map described at 312 of method 300 and in greater detail below, with reference to FIG. 9. The hyperlink generation engine may refer to mapped connections between anchors and destinations provided by the text-to-destination map to identify suitable text to use as anchors. Placement of the hyperlinks may therefore be more meaningful relative to the text configured as anchors. The hyperlink generation engine may use the text-to-destination map to determine what to link, e.g., the anchor text and contents, and where to link to, e.g., the destination URL. For increased context-awareness, the text-to-destination map may be configured to group text and destinations into topics.

Thus, if the text has multiple meanings in different contexts, a selection suitable for a current use-case may be chosen based on the context of the webpage and other nearby text.

For example, when determining text to be configured as the anchor text as well as an associated destination URL, the hyperlink generation engine may first detect a keyword or phrase in a text corpus. Selection of which keywords and phrases to detect, may be assisted by narrowing a list of possible keywords and phrases to only relevant keywords and phrases based on the context of the webpage. For example, in a webpage article describing “sports”, a listed keyword such as “dogs” may have little relevancy to sports. Thus, upon identification of a keyword/phrase match between the text corpus and the list, the hyperlink generation engine may apply the HTML parser to determine if a hyperlink is suitable at the corresponding location of the webpage.

As an example, a keyword may be detected in “alt text” of an HTML image. Since a hyperlink cannot be added inside of alt text, the hyperlink may be disregarded and not generated. In other instances, a phrase may be detected as a “sub-word” inside of another word, such as “Base” in “Baseball”. In such examples, the sub-word may be ignored. In addition, if more than one match is found, the matches may be examined according to length, e.g., from longest to shortest, thereby hyperlinking the longest phrase first. For example, if both “Running” and “Running Back” are detected in the text corpus, the hyperlink generation engine may first confirm if the longer phrase, e.g. “Running Back”, is present at the text location and preferentially hyperlink “Running Back”, if available, before hyperlinking “Running”. By analyzing the longer phrases first, an accuracy of hyperlink placement according to user interest may be increased.

Figure 5:
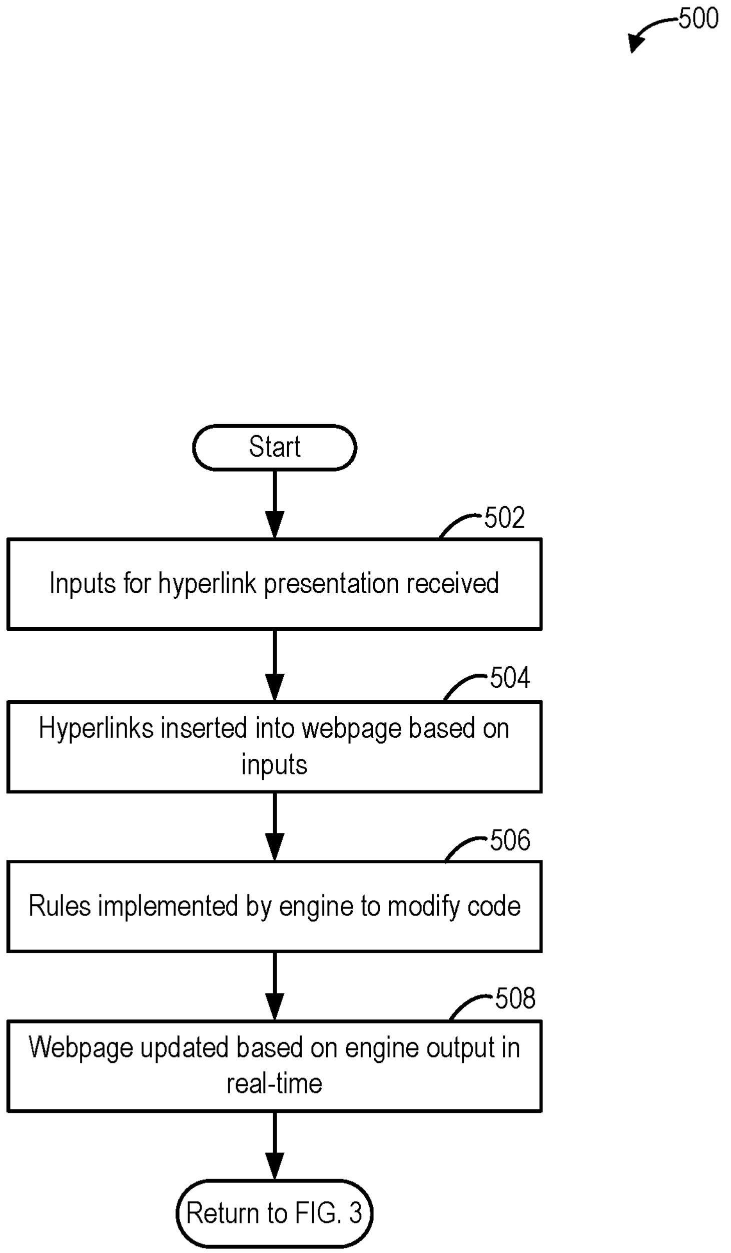
FIG. 5 shows an example of a method for modifying a presentation of hyperlinks based on user behavior which may be included in the method of FIG. 3.
Figure 6A:
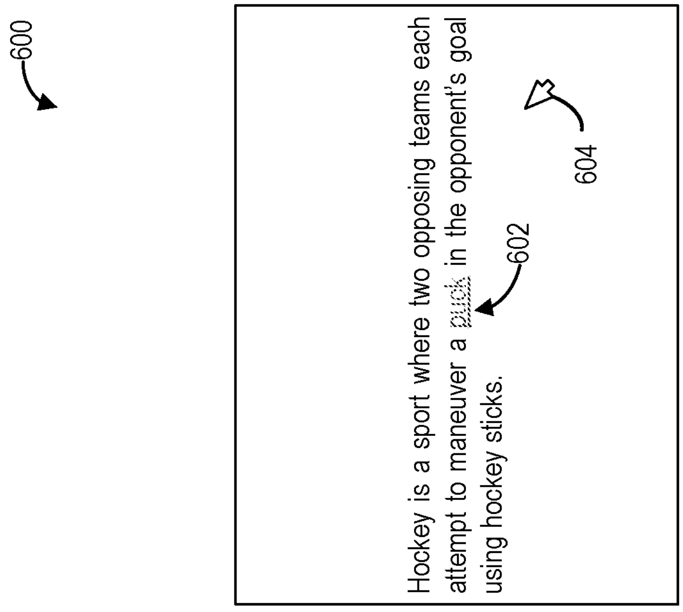
FIG. 6A shows a first example of a presentation of a hyperlink.
Figure 6B:
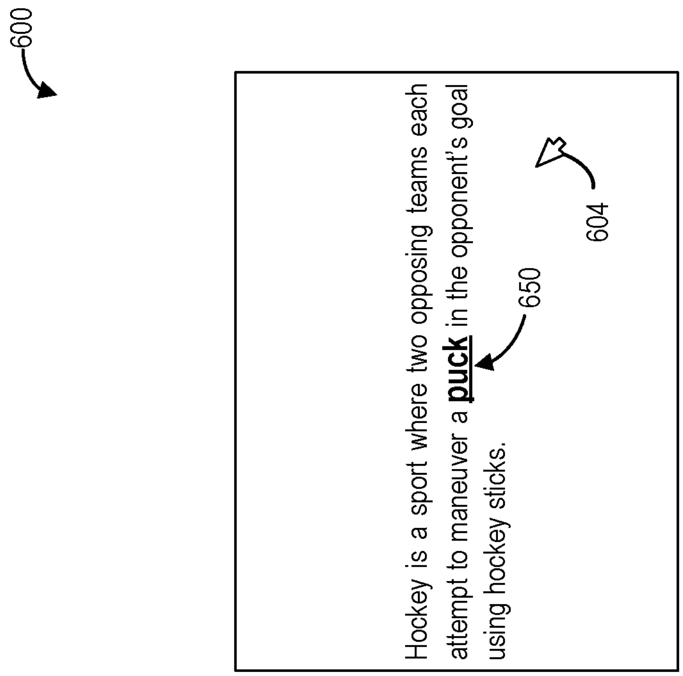
FIG. 6B shows a second example of the presentation of the hyperlink of FIG. 6A.

A method 500 for adjusting a presentation of the hyperlinks via the hyperlink generation engine is depicted in FIG. 5. At 502, the method includes receiving inputs from a user for defining how the hyperlinks may be displayed, according to predetermined conditions. For example, a set of rules providing instructions for how the hyperlinks may be styled, e.g., a font, color, typeface, size, etc., and actions, such as flashing, color changes, fading, movement, etc., which may be displayed at the anchor of the hyperlinks may be input. The set of rules may include linking of a style or action to a specific type of hyperlink, a specific destination, and/or user behavior. In some examples, the set of rules may be determined by the hyperlink generation engine using various machine learning and artificial intelligence techniques as the engine learns how to select variables of the set of rules to optimize results for a user on a specific website. Furthermore, the user may provide a specific webpage, or group of webpages, at which the set of rules may be implemented and a list of anchors and corresponding destinations. The inputs may be entered at the user interface and received by the hyperlink generation engine.

At 504, the method includes inserting hyperlinks into the electronic text file of the webpage via the HTML parser according to the received inputs. The HTML parser may add hyperlinks and, at 506, may read the set of rules into the HTML code such that the rules are tied to an output, e.g., generation of the hyperlinks, of the hyperlink generation engine. Thus, when the hyperlinks are displayed at the user interface, the presentation of the hyperlinks are automatically defined by the set of rules.

At 508, the method includes updating the webpage in real-time to display the output from the hyperlink generation engine. As described above, the hyperlink generation engine may place hyperlinks in the webpage based on the user's behavior, as shown in FIG. 4. The hyperlink generation engine may further dynamically adjust the presentation of the hyperlinks as defined by the set of rules and the predetermined conditions. The predetermined conditions may include, for example, whether the destination is an external link, e.g., the destination is a different website relative to the anchor, and/or an affiliate link, e.g., the website may earn a commission if the user selects the affiliate link. As an example, the anchors may be different colors for the external link versus the affiliate link or when the anchor is configured as both an external link and an affiliate link. In addition, the affiliate link may be coupled to a pop-up disclosure message identifying the hyperlink as an affiliate link when the hyperlink is selected.

As another example, as described above, the user may not notice a hyperlink or select a hyperlink even though the hyperlink is relevant to information predicted to be of interest to the user. After a duration of time that the hyperlink is displayed but not selected, the presentation of the hyperlink may be adjusted to attract the user's attention. For example, the anchor of the hyperlink may execute some type of movement or animation, such as jumping, changing size, rotating, etc., or alter its appearance, e.g., change color, flash, etc., to increase a visibility of the anchor. The anchor may also be removed entirely or be moved to a different location in the webpage to attract the user's attention.

An example of how the hyperlink presentation may change is shown in FIGS. 6A-6B. Therein, a user interface 600 is shown, depicting a first embodiment of a hyperlink 602 in FIG. 6A, the hyperlink embedded in a text of a webpage. The first embodiment of the hyperlink 602 is displayed according to an initial set of parameters as defined by the set of rules. For example, the first embodiment of the hyperlink 602 may show an anchor, e.g., “puck”, of the hyperlink underlined and in a different grayscale shade than the rest of the text. After a period of time passes during which a mouse cursor 604 remains stationary and near the first embodiment of the hyperlink 602, the hyperlink generation engine may command adjustment of an appearance of the anchor. As shown in FIG. 6B, a resulting, second embodiment of the hyperlink 650 may increase a size and boldface character of the text of the anchor to increase a visibility of the second embodiment of the hyperlink 650.

The placement and presentation of the hyperlinks of a webpage may therefore be continuously updated and modified based on user behavior and the set of rules input to the hyperlink generation engine. In one example, the modifications to the presentation of the hyperlinks may be displayed using javascript. Method 500 returns to method 300 of FIG. 3, e.g., at 304 of method 300.

Figure 7:
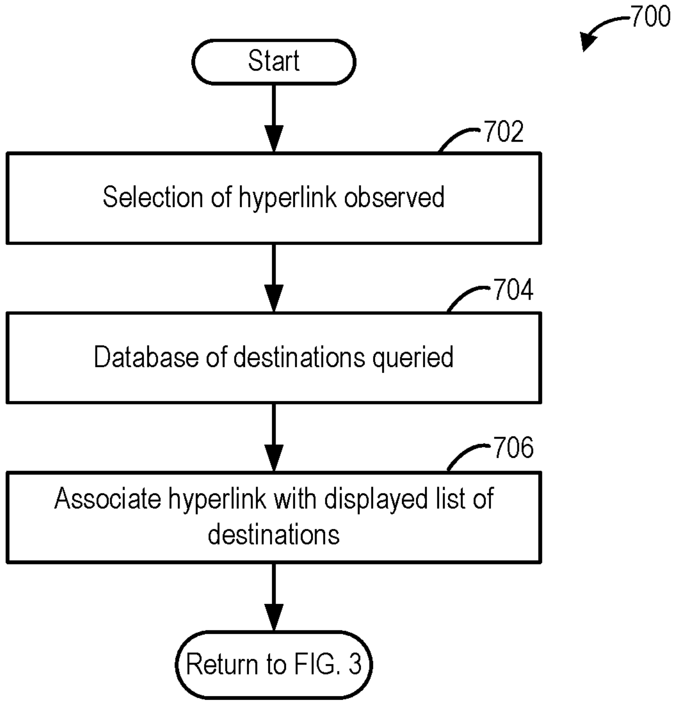
FIG. 7 shows an example of a method for generating a hyperlink with multiple destinations which may be included in the method of FIG. 3.
Figure 8A:
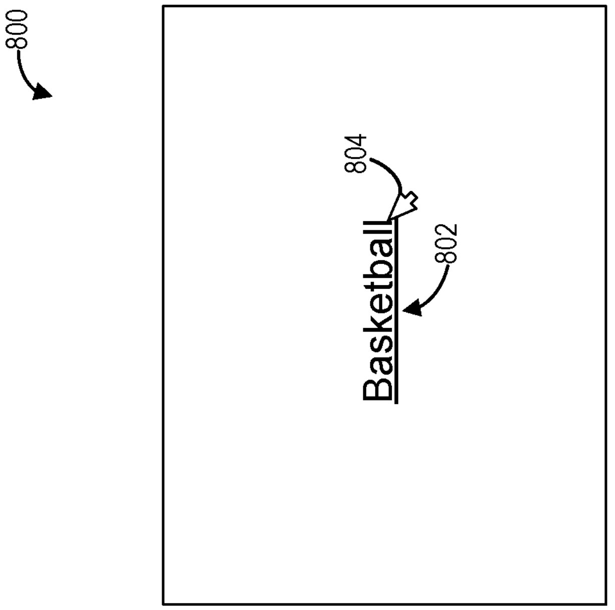
FIG. 8A shows an example of a hyperlink which may be linked to more than one destination.
Figure 8B:
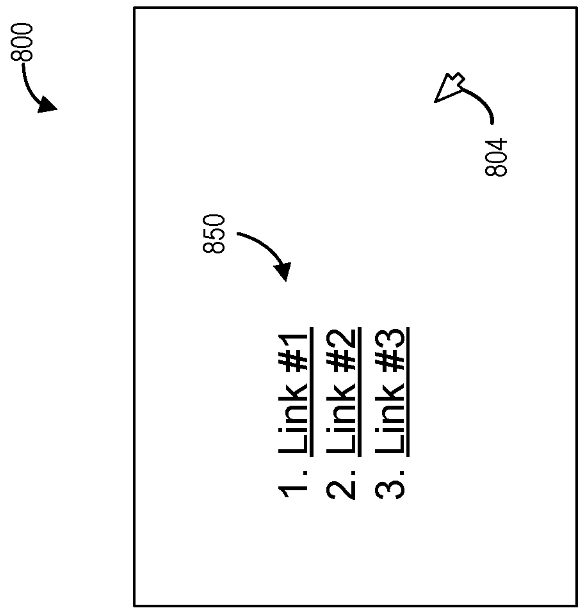
FIG. 8B shows an example of a list of destinations linked to the hyperlink of FIG. 8A.

Turning now to FIG. 7, a method 700 for generating hyperlinks coupled to more than one destination is shown. In conventionally configured hyperlinks, the anchor may be coupled to a single destination unless javascript is used to create a pop-up. Javascript, however, may be unreliable and may be presented differently depending on a web browser used. By directly linking the hyperlink to a list of destinations, e.g., the list is written into the HTML code of the electronic text file, display of the list may be more robust.

At 702, the method includes observing selection of a hyperlink in a webpage, e.g., by the hyperlink generation engine. For example, the user may use the mouse cursor to click on the hyperlink, indicating an interest in the additional information provided by the hyperlink. A movement and positioning of the mouse cursor may be tracked by the hyperlink generation engine.

A query is directed to a database of hyperlink destinations at 704 to search for suitable destinations, e.g., matches or hits. A single destination may be returned if there is only a single hit is found in the database. In instances where multiple hits are found in the database of hyperlink destinations for the given text, e.g., at the anchor of the hyperlink, a destination list may be returned. Related hyperlinks may also be included according to a common topic or category of the text. In some examples, when a single destination is desired, a global setting for the website may be adjusted to selectively return only single destinations. User behavior data may be collected to assist the hyperlink generation engine to determine if the single destination or the destination list results in higher performance (e.g., meeting the user's request for information). The determination may be used to guide future decisions. Site-wide user behavior may also be used to determine if generation of the destination list is activated or deactivated based on a specific use-case. Alternatively, machine learning or artificial intelligence may be used to determine a suitable destination result delivered to the user based on collected datasets. In yet other examples, cross-sharing data between websites and link data of the website may be used. The database of hyperlink destinations may be included in a webpage database and indexed in a webpage database index, such as the webpage database 116 and the webpage database index 114 of FIG. 1.

The hyperlink generation engine may, for example, obtain a selection of destinations from the database as a result of the query, where the destinations are related to a topic indicated by an anchor of the hyperlink. The hyperlink generation engine may thereby populate a list with a threshold number of relevant destinations. The threshold number may be, for example, three relevant destinations. As another example, the threshold number may vary depending on a total number of relevant destinations. For example, the threshold number may be 5% of the total number of relevant destinations.

In some instances, the list of destinations may be organized according to a ranking of relevancy. For example, each destination in the list may be ranked according to a saliency of the destination to the topic indicated by the anchor. The ranking may be conducted based on, as one example, a number of times the anchor (e.g., the text of the anchor) appears in the destination text. Other ranking factors may include global settings for a specific website set by user input that provide instructions for ranking the destinations. For example, the user may select relevant names and entities to be ranked above phrases. As another example, the user may indicate ranking of the destinations based on page ranking.

Furthermore, websites may be classified into certain topics based on the content provided by a website and associated webpages. Websites covering similar topics may be closely related and called "neighborhood sites" as a result. When ranking hyperlinks, choosing URLs from related websites, such as the neighborhood sites, may be more effective than random selections. For example, a website about "Basketball" may be preferentially hyperlinked to a webpage of a website about "Coaching Basketball". In comparison, hyperlinking the website about "Basketball" to a website on "Fashion" or "Politics", may be ineffectual since these topics may not be categorized within the same neighborhood topic.

When comparing hyperlinks for ranking, evaluation of a relevancy of the page may be advantageous. A "weighted score" may be used to compare URLs based on their relevancy to the webpage where the hyperlink is being added. The meta data of each resource may be compared for relevancy including the Title tag of the page. Additionally, natural language processing (NLP) techniques may be used to assess a topic of each resource and the resource relates to a topic of interest more efficiently. Other ranking factors may include page rank and an amount of quality backlinks linking to a respective URL.

At 706, the method includes associating the selected hyperlink anchor with the list of destinations by displaying the list of destinations. Examples of a hyperlink and an associated ranked destination list are shown in FIGS. 8A-8B, respectively. An anchor 802 of a hyperlink of a first webpage is depicted in a user interface 800 in FIG. 8A. When a mouse cursor 804 is placed over the anchor 802 and the user selects the hyperlink by clicking a button of the mouse, the hyperlink generation engine may command display of a second webpage at the user interface 800, as shown in FIG. 8B. The second webpage displays a ranked list 850 of hyperlink anchors, each of the anchors linked to a destination deemed relevant to the anchor topic, e.g., basketball.

An order of the hyperlink anchors presented in the ranked list 850 represents how relevant each of the hyperlinks is relative to the original hyperlink of FIG. 8A. For example, a first link of the ranked list 850, represents a destination that is more relevant to basketball than a second link of the ranked list 850, and the second link is more relevant than a third link of the ranked list 850. Furthermore, although the ranked list is displayed in a different webpage from the original hyperlink anchor in FIGS. 8A-8B, other examples may include displaying the ranked list as a pop-up when the original hyperlink anchor is selected. In yet other examples, the list may not be ranked or the list may organize the destinations according to a set of categories.

For example, referring back to the hyperlink anchor 802 of FIG. 8A, the list of destinations may include webpages directed to categories including rules of basketball, basketball equipment, and a history of basketball. The destinations may be each assigned to a suitable category and displayed to the user as a table correlating the destinations to the assigned category which may be presented at a different webpage, presented as a pop-up at the current webpage, or displayed as a bulleted list of hyperlinks with their corresponding names.

Returning to FIG. 7, displaying the list of destinations may allow the user to choose a destination from the list. By generating multiple destinations associated with one hyperlink anchor, the user may quickly and efficiently obtain additional information that is customized to the user's interests. The hyperlink generation engine may continuously modify hyperlinks in real-time to include the list of destinations or connect the hyperlinks to single destinations as the user navigates a webpage. Method 700 returns to method 300 of FIG. 3, e.g., to 304 of method 300.

As depicted at 312 of method 300 and described above, dynamic hyperlink generation in real-time may also include generating and/or updating the text-to-destination map of a website. Turning now to FIG. 9, a method 900 for generating/updating a text-to-destination map using the hyperlink generation engine is shown. The text-to-destination map may be an efficient tool to log pairs or sets of anchors with their corresponding destinations, thereby providing the hyperlink generation engine a dataset to refer to when adding new hyperlinks to a webpage of the website or when modifying hyperlinks.

For large content websites, such as websites with thousands of webpages, determination of where to automatically add hyperlinks may be time-consuming and inefficient. The text-to-destination map tool of the hyperlink generation engine may automatically identify linkable text in each webpage of the website, such as nouns, entities, names, phrases, and images, which may be used as hyperlink anchors, and their associated destinations. A record may be created which may be accessed by the hyperlink generation engine for future hyperlink generation. The tool may generate maps of the anchors and destinations which may be queried in real-time when the user is interacting with the webpages, thereby assisting in meaningful and useful dynamic hyperlink placement. The text-to-destination map may be recorded, for example, at a database accessible to the hyperlink generation engine.

At 902, the method includes extracting data from the website (e.g., the website hosting webpages with embedded hyperlinks) using a web scraper. The web scraper may be, for example, a bot or web crawler configured to gather and copy content from the webpages of the website. Each hyperlink of the webpages may be analyzed and mapped by the web scraper at 904. For example, for hyperlinked images, the linkable text may be identified, e.g., the anchor, and the alternate text (hereafter, alt text) linked to the anchor may be extracted from each hyperlink and mapped to its corresponding destination, where the alt text is text used within the HTML code of a hyperlink to describe attributes of the hyperlink. In another example, a sitemap provided by the website may be used to extract data. The sitemap may be configured as a map of all URLs of the website.

In addition, meta data of the pages may be collected, such as a Title tag of the page (e.g., webpage) to generate a record for the text-to-destination map. As one example, a page with a Title tag of "Tennis Racquets" may be used to generate a record for the text "Tennis Racquets" associated with its URL or destination. Using NLP techniques, other text can be created such as synonyms, inflections, as well as text in other languages. A category or topic may be assigned to the record using breadcrumbs (e.g., a secondary navigation scheme that shows the user's location in the website or application) of the page and a structure of the website. Other meta data of the page, such as a Description, may be used to generate other forms of linkable text. By parsing through the content of the entire web page and its structures, such as headings and paragraphs, the hyperlink generation engine may continue to add additional linkable phrases and sentences related to the resource.

At 906, the method includes outputting the extracted data in a format usable across various applications, such as JavaScript Object Notation (JSON), extensible Markup Language (XML), Comma Separated Values (CSV), etc. In other words, a dataset comprising the extracted data may be converted to a format accessible by different software programs. The converted data may then be used by an Application Programming Interface (API) to retrieve, interpret, and present the data according to a desired usage. Once the text-to-destination map is generated, it may be used by the hyperlink generation engine to determine which text to hyperlink as well as the destination URL of the hyperlink. With each addition of a hyperlink, user behavior data may be collected based on interactions with the hyperlink. If the user behavior data indicates that either the content of the hyperlink or the destination of the hyperlink performs poorly, the text-to-hyperlink map may be updated by either changing the linkable text or the URL. The hyperlink generation engine may present the hyperlink with various styles before determining if the hyperlink is to be removed from or updated at the text-to-hyperlink map. Method 900 returns to method 300 of FIG. 3, e.g., to the start of method 300.

In this way, a placement and presentation of hyperlinks on a webpage may be adjusted according to a user's behavior. By implementing a hyperlink generation engine adapted with algorithms for tracking the user's interaction with the webpage, the user may obtain information provided by the webpage in a more meaningful and useful manner. The hyperlink generation engine may anticipate what information the user is seeking based on the user's behavior and add or remove hyperlinks to the webpage in real-time. An appearance and behavior of the hyperlinks may also be customized according to the user's interaction with the webpage to assist in directing the user's attention to relevant information, including hyperlinks providing more than one destination. An efficiency of the hyperlink generation engine may be further enhanced by creating and continuously updating a text-to-destination map which may allow a dataset, including hyperlink anchors and associated destinations, to be stored and retrieved upon demand. The hyperlink generation engine may refer to the text-to-destination map to determine where to place hyperlinks in upcoming sections of the webpage based on previous placements, e.g., previously generated hyperlinks, in conjunction with monitoring of the user's behavior. As a result, the user may have a customized, more engaging interaction with the webpage and desired information may be conveyed to the user more efficiently.

The technical effect of adapting a website with dynamic hyperlink generation in real-time is that a placement and appearance of hyperlinks on a webpage may be modified in real-time in response to a user's interaction with the website.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the systems described above with respect to FIG. 1. The methods may be performed by executing stored instructions with one or more logic devices (e.g., processors) in combination with one or more hardware elements, such as storage devices, memory, hardware network interfaces/antennas, switches, actuators, clock circuits, and so on. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

The disclosure also provides support for a method for generating a hyperlink in real-time, comprising: monitoring a user's interaction with a document via algorithms of a hyperlink generation engine implemented at a processor of a client system, displaying a first hyperlink in the document at a user interface of a display device based on the user's interaction, and mapping an anchor and a destination of the first hyperlink to generate a dataset used to place a second hyperlink in the document during a subsequent hyperlink generation event. In a first example of the method, monitoring the user's interaction with the document includes tracking a position of a mouse cursor. In a second example of the method, optionally including the first example, displaying the first hyperlink includes inserting the first hyperlink at one of a word or a section of the document where the mouse cursor hovers for a period of time and wherein the first hyperlink is inserted as a single link or as multiple links, respectively. In a third example of the method, optionally including one or both of the first and second examples, displaying the first hyperlink includes anchoring the first hyperlink to a document element relevant to a topic of interest to the user. In a fourth example of the method, optionally including one or more or each of the first through third examples, displaying the first hyperlink includes modifying a presentation of the first hyperlink. In a fifth example of the method, optionally including one or more or each of the first through fourth examples, modifying the presentation of the first hyperlink includes one or more of adjusting an appearance of the first hyperlink and linking the first hyperlink to a list of destinations. In a sixth example of the method, optionally including one or more or each of the first through fifth examples, linking the first hyperlink to the list of destinations includes querying a database of hyperlink destinations and generating the list of destinations according to a number of matches found in the database of hyperlink destinations, and wherein the list of destinations is displayed when the user interacts with the first hyperlink. In a seventh example of the method, optionally including one or more or each of the first through sixth examples, the list of destinations is displayed according to a ranking of relevancy. In a eighth example of the method, optionally including one or more or each of the first through seventh examples, mapping the anchor and the destination of the first hyperlink includes extracting data from the document using a web scraper. In a ninth example of the method, optionally including one or more or each of the first through eighth examples, extracting the data from the document using the web scraper includes generating a dataset based on the extracted data and converting the dataset to a format usable by different software programs.

The disclosure also provides support for a system for automatically generating a hyperlink in real-time, comprising: a document displayed at a display device, and a processor, communicatively coupled to the display device and configured with executable instructions stored in non-transitory memory that, when executed, cause the processor to: monitor a user's interaction with the document, adjust a location and an appearance of the hyperlink in the document based on the user's interaction, map an anchor and a destination of the hyperlink and add a mapped relationship of the anchor and the destination to a text-to-destination map, display the hyperlink at the display device with the adjusted location and the adjusted appearance, and use the mapped relationship in the text-to-destination map to determine locations and appearances for display of future hyperlinks. In a first example of the system, the user's interaction with the document in monitored by collecting user behavior data regarding one or more of scrolling, clicking, navigation patterns, engagement and sharing, heat maps, session recordings, feedback widgets, and surveys. In a second example of the system, optionally including the first example, the location of the hyperlink is adjusted by adding and/or removing the hyperlink as the user interacts with the document. In a third example of the system, optionally including one or both of the first and second examples, the appearance of the hyperlink is adjusted by using a set of rules input by the user, the set of rules providing instructions for displaying the hyperlink, and wherein the set of rules includes instructions for one or more of a font, a color, a typeface, a font size, an action, a linking of a style and/or action to a specific type of the hyperlink, a linking of the hyperlink to a specific destination, and a type of user behavior to trigger adjustment of the location and the appearance of the hyperlink. In a fourth example of the system, optionally including one or more or each of the first through third examples, when the appearance of the hyperlink is adjusted by the action, the hyperlink is modified to perform one or more of flashing, changing color, fading, and moving. In a fifth example of the system, optionally including one or more or each of the first through fourth examples, the appearance of the hyperlink is adjusted by using the set of rules, the set of rules are determined using machine learning and artificial intelligence techniques to optimize the set of rules for the user for a specific website. In a sixth example of the system, optionally including one or more or each of the first through fifth examples, the processor further comprises executable instructions that, when executed, cause the processor to: insert the hyperlink into the document using a HTML parser according to the set of rules, prior to the display of the hyperlink.

The disclosure also provides support for a method for dynamically inserting a hyperlink into a document, comprising: generating a text-to-destination map using a hyperlink generation engine implemented at a processor to provide guidelines for hyperlink placement, the text-to-destination map storing relationships and associations between anchors and destinations of previously generated hyperlinks, using the text-to-destination map in combination with monitored user behavior to insert the hyperlink into the document as a user interacts with the document, and displaying the hyperlink at a display device when the user scrolls to a region of the document with the hyperlink. In a first example of the method, generating the text-to-destination map includes analyzing a webpage using a web scraper to identify linkable text and extract alt text from the linkable text, and mapping the linkable text and the alt text to a corresponding destination. In a second example of the method, optionally including the first example, generating the text-to-destination map further includes collecting meta data of the document to generate a record for the text-to-destination map.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," "third," and so on are used merely as labels, and are not intended to impose numerical requirements or a particular positional order on their objects. The following claims particularly point out subject matter from the above disclosure that is regarded as novel and non-obvious.

The invention claimed is:

1. A method for generating a hyperlink in real-time, comprising:

monitoring a user's interaction with a document via algorithms of a hyperlink generation engine implemented at a processor of a client system;

displaying a first hyperlink in the document at a user interface of a display device based on the user's interaction; and after displaying the first hyperlink, mapping an anchor and an associated destination of the first hyperlink to generate a dataset including the anchor and the associated destination, and querying the dataset in real-time when the user is interacting with the document to place continuously update and modify a second hyperlink in upcoming sections of the document during a subsequent hyperlink generation event based on previous placements as a user interacts with the document, wherein one or more of an anchor and destination of the second hyperlink are altered to an indicated topic of interest of the user by real-time monitoring of user behavior as the user interacts with the document.

2. The method of claim 1, wherein monitoring the user's interaction with the document includes tracking a position of a mouse cursor.

3. The method of claim 2, wherein displaying the first hyperlink includes generating the first hyperlink at one of a word or a section of the document in real-time where the mouse cursor hovers for a period of time, and wherein the first hyperlink is inserted as a single link or as multiple links, respectively.

4. The method of claim 1, wherein displaying the first hyperlink includes anchoring the first hyperlink to a document element relevant to a topic of interest to the user.

5. The method of claim 1, wherein displaying the first hyperlink includes modifying a presentation of the first hyperlink.

6. The method of claim 5, wherein modifying the presentation of the first hyperlink includes one or more of adjusting an appearance of the first hyperlink and linking the first hyperlink to a list of destinations.

7. The method of claim 6, wherein linking the first hyperlink to the list of destinations includes querying a database of hyperlink destinations and generating the list of destinations according to a number of matches found in the database of hyperlink destinations, and wherein the list of destinations is displayed when the user interacts with the first hyperlink.

8. The method of claim 7, wherein the list of destinations is displayed according to a ranking of relevancy.

9. The method of claim 6, wherein the list of destinations is created from websites covering topics similar to a topic of the document.

10. The method of claim 1, wherein mapping the anchor and the associated destination of the first hyperlink includes extracting data from the document using a web scraper.

11. The method of claim 10, wherein extracting the data from the document using the web scraper includes generating the dataset based on the extracted data and converting the dataset to a format usable by different software programs.

12. The method of claim 1, wherein the associated destination is of the same electronic text file as an electronic text file of the anchor, or in a different electronic text file from the electronic text file of the anchor, the different electronic text file included in a same website as the anchor, the website formed of one or more electronic text files.

13. A system for automatically generating a hyperlink in real-time, comprising:
- a document displayed at a display device; and
- a processor, communicatively coupled to the display device and configured with executable instructions stored in non-transitory memory that, when executed, cause the processor to:
  - monitor a user's interaction with the document;
  - use machine learning to adjust a location and an appearance of the hyperlink in the document for the user based on the user's interaction with the document, including in response to the user not interacting with the hyperlink and navigating to topics unrelated to the hyperlink, terminate the hyperlink;
  - after the location and the appearance of the hyperlink in the document is adjusted, map an anchor and an associated destination of the adjusted hyperlink, and add a mapped relationship of the anchor and the associated destination to a text-to-destination map by either changing a linkable text or a URL of the hyperlink;
  - display the hyperlink at the display device with the adjusted location and the adjusted appearance; and
  - use the mapped relationship in the text-to-destination map to determine locations and appearances for display of new and/or modified hyperlinks, and continuously update and modify the hyperlink in upcoming sections of the document based on previous placements as a user interacts with the document.

14. The system of claim 13, wherein the user's interaction with the document is monitored by collecting user behavior data regarding one or more of scrolling, clicking, navigation patterns, engagement and sharing, heat maps, session recordings, feedback widgets, and surveys.

15. The system of claim 13, wherein the location of the hyperlink is adjusted by adding and/or removing the hyperlink as the user interacts with the document.

16. The system of claim 13, wherein the appearance of the hyperlink is adjusted by using a set of rules and predetermined conditions input by the user, the set of rules and predetermined conditions providing instructions for displaying the hyperlink, and wherein the set of rules includes instructions for one or more of a font, a color, a typeface, a font size, an action, a linking of a style and/or action to a specific type of the hyperlink, a linking of the hyperlink to a specific destination, and the predetermined conditions include a type of user behavior to trigger adjustment of the location and the appearance of the hyperlink.

17. The system of claim 16, wherein when the appearance of the hyperlink is adjusted by the action, the hyperlink is modified to perform one or more of flashing, changing color, fading, and moving.

18. The system of claim 16, wherein the appearance of the hyperlink is adjusted by using the set of rules, the set of rules determined using machine learning and artificial intelligence techniques to select variables of the set of rules to optimize the set of rules for the user for a specific website.

19. The system of claim 16, wherein the processor further comprises executable instructions that, when executed, cause the processor to:
- insert the hyperlink into the document using an HTML parser according to the set of rules, prior to the display of the hyperlink.

20. A method for dynamically inserting a hyperlink into a document, comprising:
- generating a text-to-destination map using a hyperlink generation engine implemented at a processor to provide guidelines for hyperlink placement, the text-to-destination map storing relationships and associations between anchors and associated destinations of previously generated hyperlinks;
- using the text-to-destination map in combination with monitored user behavior to insert the hyperlink into the document, and continuously update and modify the hyperlink in upcoming sections of the document based on previous placements as a user interacts with the document including generating a hyperlink in real-time at one of a word or a section of the document where a mouse cursor hovers for a period of time;
- displaying the hyperlink at a display device when the user scrolls to a region of the document with the hyperlink; and outputting the text-to-destination map in a format accessible by software programs.

21. The method of claim 20, wherein generating the text-to-destination map includes analyzing a webpage using a web scraper to identify linkable text and extract alt text from the linkable text, and mapping the linkable text and the alt text to a corresponding destination.

22. The method of claim 20, wherein generating the text-to-destination map further includes collecting meta data of the document to generate a record for the text-to-destination map.

23. The method of claim 20, wherein the text-to-destination map is configured to group text and destinations into topics.

* * * * *